US012783241B2

(12) United States Patent
Pijourlet et al.

(10) Patent No.: US 12,783,241 B2
(45) Date of Patent: Nov. 3, 2026

(54) PROCESSOR IDENTIFICATION

(71) Applicant: STMicroelectronics International N.V., Geneva (CH)

(72) Inventors: Philippe Pijourlet, Mouans-Sartoux (FR); Brice Dufour, Cagnes sur Mer (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 99 days.

(21) Appl. No.: 18/913,223

(22) Filed: Oct. 11, 2024

(65) Prior Publication Data

US 2025/0147764 A1 May 8, 2025

(30) Foreign Application Priority Data

Nov. 3, 2023 (FR) ....................................... 2311953

(51) Int. Cl.

| | |
|---|---|
| ***G06F 12/0802*** | (2016.01) |
| ***G06F 9/30*** | (2018.01) |
| ***G06F 9/35*** | (2018.01) |
| ***G06F 11/00*** | (2006.01) |
| ***G06F 13/12*** | (2006.01) |

(52) U.S. Cl.
CPC ............ *G06F 9/35* (2013.01); *G06F 9/30043* (2013.01); *G06F 13/124* (2013.01)

(58) Field of Classification Search
None
See application file for complete search history.

(56) References Cited

U.S. PATENT DOCUMENTS

| | | | | |
|---|---|---|---|---|
| 4,291,372 | A * | 9/1981 | Forbes | G06F 9/325 710/5 |
| 5,784,712 | A * | 7/1998 | Byers | G06F 9/30043 711/219 |
| 5,819,117 | A * | 10/1998 | Hansen | G06F 9/30036 712/E9.034 |
| 5,826,106 | A * | 10/1998 | Pang | G06F 13/28 710/25 |
| 11,354,172 | B2 | 6/2022 | Behl et al. | |
| 2004/0221082 | A1* | 11/2004 | Griffin | G06F 13/126 710/305 |
| 2010/0106872 | A1* | 4/2010 | Moyer | G06F 13/16 711/E12.001 |
| 2015/0317164 | A1* | 11/2015 | Laine | G06F 13/24 712/244 |
| 2019/0102097 | A1* | 4/2019 | Madraswala | G11C 16/26 |
| 2020/0004557 | A1* | 1/2020 | Nam | G06F 9/4401 |
| 2021/0160193 | A1 | 5/2021 | Olson et al. | |

(Continued)

*Primary Examiner* — Hyun Nam
(74) *Attorney, Agent, or Firm* — Slater Matsil, LLP

(57) ABSTRACT

The present description concerns a device comprising a bus, peripherals coupled to the bus, the peripherals comprising a first circuit, processors coupled to the bus and initiating accesses to the peripherals, each comprising an address phase followed by a data phase, and for each processor, a second circuit delivering an identifier of the processor over the bus during the address phase of each access initiated by the processor. For each read access to the first circuit initiated by one of the processors, the first circuit stores the identifier present over the bus during the address phase of the access, and then delivers the identifier stored over the bus during the data phase of the access.

20 Claims, 2 Drawing Sheets

(56) References Cited

U.S. PATENT DOCUMENTS

| | | | | |
|---|---|---|---|---|
| 2023/0009095 | A1* | 1/2023 | Wang | G06F 13/1668 |
| 2025/0004879 | A1* | 1/2025 | Durham | G06F 9/30043 |
| 2026/0211681 | A1* | 7/2026 | Choudhary | G06F 9/3806 |

* cited by examiner

PROCESSOR IDENTIFICATION

CROSS REFERENCED TO RELATED APPLICATIONS

This application claims the priority benefit of French Patent Application No. 2311953 filed on Nov. 3, 2023, entitled "Identification de processeurs," which is hereby incorporated herein by reference to the maximum extent allowable by law.

TECHNICAL FIELD

The present description generally concerns electronic circuits, and more particularly systems on chip (SOCs) comprising a plurality of processors.

BACKGROUND

Devices, or systems on chip, comprising a plurality of processors configured to execute the same set of instructions are known. In such devices, the processors are coupled, for example connected, to a bus to be able to implement read and/or write accesses to peripherals coupled, for example, connected, to the bus.

In some of these known devices, the read and/or write access to each peripheral is conditioned by the identity of the processor having initiated this access. Each processor is then identified by a unique identifier, different from the identifiers of the other processors. To achieve this, each processor is associated with an identification circuit which, each time the processor initiates an access to a peripheral via the bus, conveys or delivers the identifier of the processor over the bus. Thereby, when a peripheral receives an access request, it verifies whether the identifier of the processor having initiated this access corresponds to the identifier of a processor having the authorization to access this peripheral.

Thereby, it is possible to define compartments within the device, each compartment comprising a processor and all the peripherals to which the processor is authorized to access. The identifier of each processor, delivered by the identification circuit associated with this processor, is, for example, called the compartment identifier.

These known compartmentalized devices have various disadvantages.

SUMMARY

There exists a need to overcome all or part of the disadvantages of the above-described known compartmentalized devices.

For example, it would be desirable to have a compartmentalized device of the above-described type, where each processor would be capable of obtaining its compartment identifier.

An embodiment overcomes all or part of the disadvantages of the above-described known compartmentalized devices.

An embodiment provides a device comprising a bus, peripherals coupled to the bus, the peripherals comprising a first circuit, processors coupled to the bus, and configured to execute a same instruction set and initiate accesses to the peripherals via the bus, each access comprising an address phase followed by a data phase, and, for each processor, a second circuit associated with the processor and configured to provide an identifier of the processor on the bus during the address phase of each access initiated by the processor, wherein the first circuit is configured to, at each read access to the first circuit initiated by one of the processors, store the identifier present on the bus during the address phase of the access, and provide the bus with the stored identifier during the data phase of the access.

Another embodiment provides a method implemented in a device comprising a bus, peripherals connected to the bus and comprising a first circuit, processors coupled to the bus, executing a same instruction set, each being associated with a second circuit and initiating accesses to the peripherals via the bus, each access comprising an address phase followed by a data phase, the method comprising initiating, with one of the processors, a read access to the first circuit, providing the bus with, during the address phase of the access and with the second circuit associated with the processor initiating the access, an identifier of the processor, storing with the first circuit the identifier present on the bus during the address phase of the access, providing the bus with, with the first circuit and during the data phase of the access, the stored identifier.

According to an embodiment, the peripherals comprise a memory shared between at least two of the processors, and a program defined by a sequence of instructions of the instruction set is stored in the memory and is accessible to the at least two processors.

According to an embodiment, the program comprises at least one portion the execution of which is conditioned by the identifier of the processor executing the program.

According to an embodiment, for each access by one of the processors to one of the peripherals other than the first circuit, the device is configured to condition access to the peripheral on the basis of the identifier of the processor having initiated the access.

According to an embodiment, the first circuit comprises a register configured to store, during the address phase of each read access to the first circuit, the identifier present on the bus and corresponding to the processor having initiated the read access, provide the bus with, during the data phase of each read access to the first circuit, the identifier stored during the address phase of this read access.

According to an embodiment, each identifier corresponds to a different processor.

According to an embodiment, read and write accesses to the second circuits are impossible.

According to an embodiment, the bus is of AMBA type.

According to an embodiment, the identifier of each processor is hard-coded in the second circuit associated with this processor.

According to an embodiment, the first circuit is read-only accessible.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For clarity, only those steps and elements which are useful to the understanding of the described embodiments have been shown and are described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, where reference is made to absolute position qualifiers, such as "front", "back", "top", "bottom", "left", "right", etc., or relative position qualifiers, such as "top", "bottom", "upper", "lower", etc., or orientation qualifiers, such as "horizontal", "vertical", etc., reference is made unless otherwise specified to the orientation of the drawings.

Unless specified otherwise, the expressions "about", "approximately", "substantially", and "in the order of" signify plus or minus 10%, preferably of plus or minus 5%.

Figure 1:
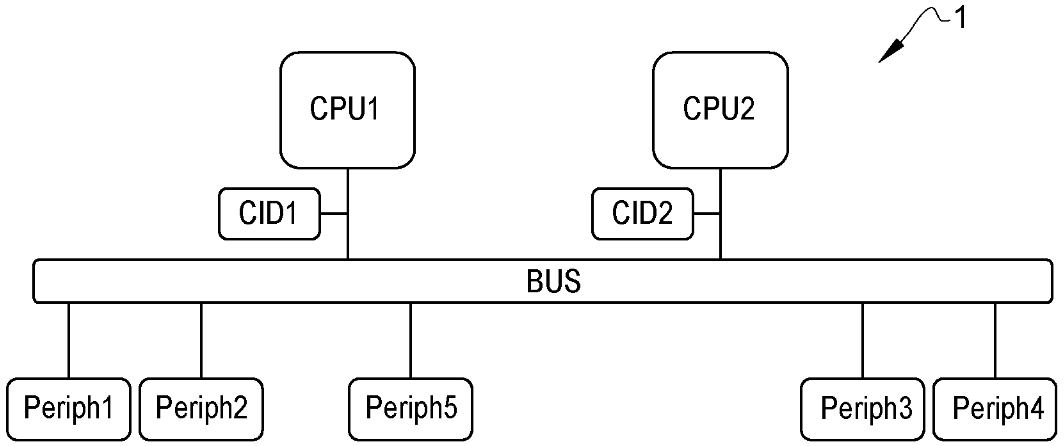
Fig. 1 (PRIOR ART)
FIG. 1 shows, in the form of blocks, an example of a device to which the described embodiments and variants apply.

FIG. 1 shows, in the form of blocks, an example of a device or system on chip 1 to which the described embodiments and variants apply.

Device 1 comprises N processors CPUi, with N an integer greater than or equal to 2, and i an integer index ranging from 1 to N. In the example of FIG. 1, N is equal to 2 and the device thus comprises two processors CPU1 and CPU2. Processors CPUi are configured to execute the same set of instructions. Preferably, processors CPUi are identical, although this is not essential provided that they can execute the same set of instructions.

Device 1 also comprises M peripherals Periphj, with M a positive integer and j an integer index ranging from 1 to M. In the example of FIG. 1, M is equal to 5 and device 1 comprises peripherals Periph1, Periph2, Periph3, Periph4, and Periph5. As an example, one of the M peripherals, for example peripheral Periph5 in the example of FIG. 1, is a memory shared between at least two of the N processors.

Device 1 further comprises a bus BUS having peripherals Periphj coupled, for example connected, thereto and having processors CPUi coupled, for example connected, thereto.

Processors CPUi are the circuits of device 1 which are configured to initiate read and/or write accesses to other circuits, for example, peripherals Periphj, coupled to bus BUS. Processors CPUi then have the role of "master" circuits. Conversely, devices Periphj cannot initiate read and/or write accesses to the other circuits coupled to bus BUS. Peripherals Periphj then have the role of a "slave" circuit.

In device 1, processors CPUi are configured so that each read or write access to a peripheral Periphj initiated by a processor CPUi, via bus BUS, comprises two successive phases. More specifically, each read or write access to a peripheral Periphj comprises a first phase, called address phase, followed by a second phase, called data phase.

For example, during the address phase of an access, the processor CPUi having initiated this access delivers over bus BUS, the address where the CPUi desires to write or read data, and thus the address of the peripheral Periphj to which it desires access, and an indication that the requested access is a read or write access.

As an example, bus BUS comprises a plurality of conductive wires over which the data write or read address bits are simultaneously transmitted, in parallel, each address bit being transmitted over a corresponding conductive wire.

As an example, bus BUS comprises a conductive wire over which is transmitted the indication that the access is a read access or a write access. For example, a bit in a first binary state is transmitted over this conductor to indicate a read access, and in a second binary state to indicate a write access.

As an example, bus BUS comprises a conductor over which is available a clock signal clocking the first and second phases of each access.

As an example, the bus comprises a conductive wire over which is transmitted a bit indicating, by a first binary state, that data bits available on the conductors of bus BUS are valid and can be read, and, by a second binary state, that the data bits available on the conductors of the bus are not valid.

As an example, each first phase has a duration of one clock signal cycle. As an example, in this case, the address bits, the bit indicating the type (read or write) of the access and, for example, the bit indicating whether the bits over bus BUS are valid or not are then transmitted simultaneously and in parallel.

For example, during the data phase of an access, the data which are read or written are transmitted over the bus. As an example, bus BUS comprises a plurality of wires over which the written or read data bits are simultaneously transmitted, in parallel, each data bit being transmitted over a corresponding conductive wire.

As an example, bus BUS is of AMBA (Advanced Microcontroller Bus Architecture) type.

Device 1 further comprises, for each processor CPUi, a circuit CIDi associated with processor CPUi. Thus, in the example of FIG. 1, a circuit CID1 is associated with processor CPU1, and a circuit CID2 is associated with processor CPU2.

Each circuit CIDi comprises the compartment identifier of the processor with which it is associated.

As an example, in certain operating phases, for example when processors CPUi are switched off to implement a low-power mode, one or a plurality of compartment identifiers of one or a plurality of processors, for example one or a plurality of switched-off processors, may be delegated to another processor, for example a processor which has remained on. Thus, the processor CPUi to which one or a plurality of identifiers of compartments of other processors CPUi have been delegated can implement functions normally assigned to these other processors. For example, a processor CPUi which has remained on can implement functions normally assigned to a processor which has been switched off, which enables to leave this other processor off. This temporary assignment to a processor of the compartment identifier(s) of one or a plurality of other processors is, for example, called "compartment identifier delegation".

As an example, in each circuit CIDi, the compartment identifier of the processor CPUi having circuit CIDi associated therewith is hard-coded, that is, coded in hardware fashion.

For example, the compartment identifier of each processor CPUi is determined once and for all on design of device 1. In other words, this identifier cannot be changed.

Preferably, each circuit CIDi is neither a peripheral Periphj nor a processor CPUi. For example, circuits CIDi cannot initiate a read or write access to a peripheral Periphj. Further, circuits CIDi are, for example, accessible neither in read mode nor in write mode.

Each circuit CIDi is configured, for each access (read or write) to a peripheral Periphj via bus BUS which is initiated by its associated processor CPUi, to deliver over the bus the compartment identifier of this processor CPUi, during the data phase of this access. As an example, bus BUS comprises a plurality of wires over which are transmitted bits corresponding to (or encoding) the compartment identifier of the processor having initiated the access. Thereby, the bits of the compartment identifier are transmitted simultaneously, in parallel, each bit of the compartment identifier being transmitted over a conductor dedicated for this purpose.

As already mentioned, the provision of one compartment identifier per processor CPUi enables to compartmentalize device 1. In other words, this enables to define, or to select, for each processor CPUi, which peripheral(s) Periphj this processor may access.

As an example, a peripheral may be accessible to a plurality of processors CPUi. For example, when peripheral Periph5 is a memory, this memory may be accessible to a plurality of processors, for example to the two processors CPU1 and CPU2 in the example of FIG. 1, the memory then being said to be "shared".

To implement these compartments in device 1, each peripheral Periphj is configured, when it receives an access request initiated by a processor CPUi, during the data phase of this access, to condition this access, that is, the implementation of the data read or write access in the peripheral, to the compartment identifier of the processor CPUi having initiated the access.

For example, when a processor CPUi initiates an access to a peripheral Periphj, since the circuit CIDi associated with processor CPUi supplies bus BUS, during the address phase of this access, with the compartment identifier of processor CPUi, peripheral Periphj determines which processor has initiated the access due to the compartment identifier which it reads over bus BUS during the data phase. Then, peripheral Periphj compares this read identifier with the compartment identifier(s) of a list comprising the compartment identifier(s) of all the processors CPUi of device 1 which have the right to access this peripheral Periphj. If the read compartment identifier is found in this list, the processor CPUi having initiated the access effectively has the right to access peripheral Periphj, and the access carries on with the data phase, during which peripheral Periphj will supply data over the bus (for a read access) or receive data (for a write access).

As an example, in FIG. 1, peripherals Periph1 and Periph2 are only accessible by processor CPU1, peripherals Periph3 and Periph4 are only accessible by processor CPU2, and peripheral Periph5 is accessible by both processors CPU1 and CPU2. Device 1 then comprises two compartments.

A disadvantage of device 1 is that each processor CPUi has no access to its compartment identifier, or, in other words, does not know its identifier.

To overcome this disadvantages, it is provided to add a circuit to the peripherals. On each read access to this circuit, this circuit stores, during the address phase of the access, the compartment identifier of the processor having initiated the access, after which this circuit supplies the bus, during the data phase of the access, with the identifier stored during the address phase.

Preferably, the stored identifier delivered over the bus during the data phase of the access corresponds to the data read during this read access. For example, when the bus comprises conductive wires configured to transmit in parallel, during the data phase of an access, the bits of the data read or written during this access, then the stored identifier is transmitted, during the data phase, over these conductive wires.

Figure 2:
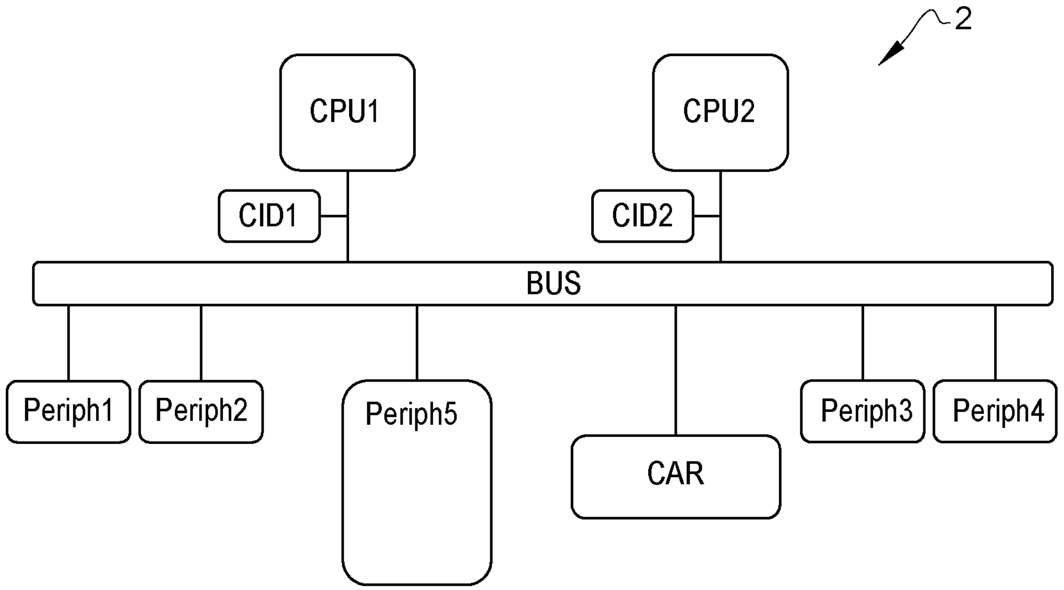
FIG. 2 shows, in the form of blocks, an example of embodiment of a device.

FIG. 2 shows, in the form of blocks, an example of embodiment of a device 2.

Device 2 is similar to the device 1 of FIG. 1, and only the differences between these two devices are here highlighted. In other words, unless otherwise indicated, all that has been indicated for device 1 applies to device 2.

As compared with device 1, device 2 comprises, in addition to the M peripherals Periphj, an additional peripheral CAR. Circuit CAR is coupled, for example connected, to bus BUS.

Preferably, circuit or peripheral CAR is read-only.

As an example, a read access to peripheral CAR is performed in the same way as a read access to one of peripherals Periphj.

For each read access to peripheral CAR initiated by one of processors CPUi, peripheral CAR is configured to store the compartment identifier of the processor CPUi which has initiated the access. This storage is performed during the address phase of the access, the compartment identifier of the CPUi processor having initiated the access then being available over bus BUS. For example, circuit CAR detects that a processor has initiated a read access to circuit CAR by comparing its address with that available over bus BUS during the address phase of the access, and by detecting over bus BUS that the requested access is a read access.

Further, circuit CAR is configured, during the data phase of this access, to deliver over bus BUS the stored identifier. More particularly, circuit CAR is configured, during this data phase, deliver over bus BUS the compartment identifier so that the processor CPUi having initiated the read access obtains its compartment identifier, or, in other words, that it can read this compartment identifier.

For example, the compartment identifier stored by circuit CAR during the address phase of the access is returned over bus BUS during the next data phase as being the data item transmitted over the bus.

For example, each time a processor CPUi validly accesses a peripheral Periphj, during the data phase of the access, the data item to be read or written corresponding to this access transits over bus BUS and, in the case of a read access to peripheral CAR, this data item corresponds to the compartment identifier stored by circuit CAR during the address phase of this read access.

Thereby, when a processor CPUi desires to know its compartment identifier, it is sufficient for this processor CPUi to initiate a read access to circuit CAR, so that it receives, during the data phase of the access, its compartment identifier in the form of the data item read from circuit CAR.

The fact for each processor CPUi of device 1 to be able to obtain its compartment identifier has a number of advantages.

For example, according to an embodiment, one of the M peripherals Periphj, for example peripheral Periph5, is a memory shared between at least two processors of device 2, for example between processors CPU1 and CPU2 in the example of FIG. 2. It is then possible to store in memory Periph5 a computer program code common to these two processors, this program comprising portions having their execution conditioned by the identifier of the processor executing the program.

In other words, the code comprises one or a plurality of portions, each of which can (or must) only be executed by the one of the processors CPU1 and CPU2 which is assigned to this portion. Thus, when one of processors CPU1 and CPU2 executes the code and reaches such a portion of the code, it only executes this code portion if its compartment identifier corresponds to the compartment identifier of the processor having the right to execute this code portion. To achieve this, the processor executing the code implements a read access to circuit CAR in order to obtain its compartment identifier, and compares its compartment identifier thus obtained with that which conditions the execution of the code portion. If the two identifiers are identical, the processor executes the code portion, and conversely, if the two identifiers are different, the processor does not execute the code portion. The program common to a plurality of processors which is stored in a shared memory is, for example, defined by a sequence of instructions of the set of instructions common to these processors.

As an example, there is called "HSR→Attr" the compartment identifier of a processor CPUi which is obtained by this processor CPUi during a read access to circuit CAR, CPU1_CID the compartment identifier of processor CPU1, CPU2_CID the compartment identifier of processor CPU2, P a code executable by either of processors CPU1 and CPU2, P1 a first portion of code C, and P2 a second portion of this code P. As an example, it is considered that code P has the following form:

```
if (HSR->Attr == CPU1_CID) {
P1}
elsif (HSR->Attr == CPU2_CID) {
P2}.
```

When this example of code P is executed by processor CPU1, the latter accesses circuit CAR in reading when it reaches the "if (HSR→Attr==CPU1_CID)" condition, and then compares the obtained identifier with identifier CPU1_CID. Since they are equal, condition HSR→Attr==CPU1_CID is fulfilled and processor CPU1 executes code portion P1. Then, when processor CPU1 reaches the "elsif (HSR→Attr==CPU2_CID)" condition, it either performs another read access to circuit CAR if it had not stored the identifier obtained during the previous read access to circuit CAR, or it directly uses the identifier obtained during the previous read access to circuit CAR if it had stored it. The processor then compares the identifier obtained by means of the read access to circuit CAR with identifier CPU2_CID. Since they are different, condition HSR→Attr==CPU2_CID is not fulfilled, and processor CPU1 does not execute portion P2. Similarly, when code P is executed by processor CPU2, the processor does not execute portion P1, but executes portion P2.

Conditioning the execution of one or a plurality of portions of a code to the compartment identifier of the processor CPUi executing the code enables this code to be common to a plurality of processors CPUi, while keeping code portions which can only be executed by a given processor. As a result, instead of storing in memory a specific code for each processor CPUi, what is stored in memory is a code common to a plurality of processors, with one or a plurality of specificities for at least one of these processors.

This enables to decrease the size of memory Periph5.

This also enables, when the code needs to be updated to modify or to add a function or code portion specific to one of processors CPUi, the verification of the obtained code and its deployment to be simplified.

Although an example of a code P common to two processors CPU1 and CPU2 has been described hereabove, those skilled in the art are capable of providing a code common to more than two processors based on the functional indications given above.

Further, although there has been described hereabove an example of a code P common to a plurality of processors CPUi, in which code P comprises a portion specific to each processor CPUi, those skilled in the art will be capable of providing a code common to a plurality of processors comprising at least one portion specific to a given processor, and which may or not comprise, for each other processor sharing this code, at least one portion specific to this processor.

Although there has been described an example of a code P common to two processors CPU1 and CPU2 in which portion P1 can only be executed by processor CPU1, and portion P2 can only be executed by processor CPU2, in other examples not shown where the device additionally comprises a processor CPU3, at least one of the portions P1 and P2 can be executed by more than one processor. For example, in this case, portion P1 can be executed by one or the other of processors CPU1 or CPU3, while portion P2 can only be executed by processor CPU2.

Figure 3:
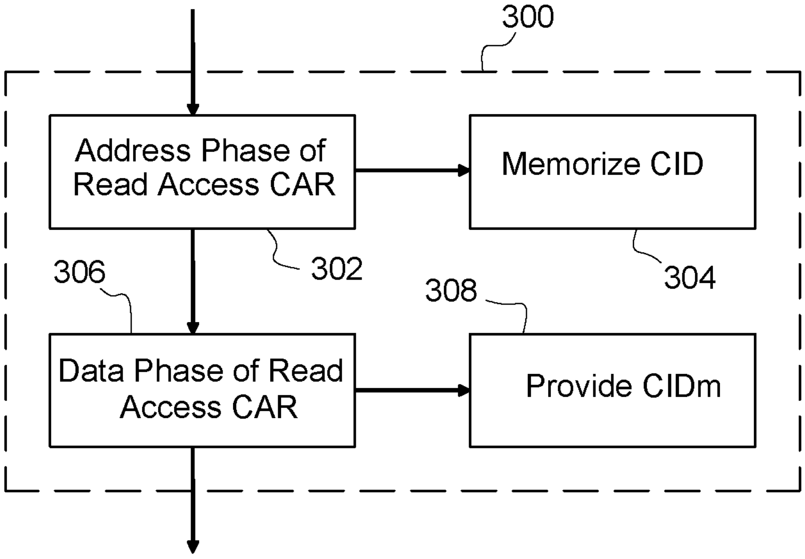
FIG. 3 shows, in the form of a flowchart, an example of embodiment of a method implemented in the device of FIG. 2.

FIG. 3 shows, in the form of a flowchart, an example of embodiment of a method implemented in the device 2 of FIG. 2.

More specifically, FIG. 3 illustrates an example of embodiment of a read access to circuit CAR, the step of read access to circuit CAR being designated with reference 300 in FIG. 3.

This phase 300 of read access to circuit CAR first comprises an address phase 302 (block "Address Phase of Read Access CAR"). During this address phase 302, the processor CPUi having initiated the read access supplies bus BUS with the address where a data item is to be read. This address corresponds, for example, to the address of peripheral CAR or of a register of peripheral CAR. Further, during this address phase 302, the circuit CIDi of processor CPUi having initiated the access supplies bus BUS with the compartment identifier of this processor CPUi.

During phase 302, at a step 304 (block "Memorize CID"), circuit CAR stores the compartment identifier present over the bus. For example, circuit CAR detects that a processor CPUi has initiated a read access to circuit CAR by means of the address and of the indication that the requested access is a read access, this information being present over bus BUS during address phase 302. As an example, the compartment identifier present over bus BUS during the address phase 302 of the read access 300 to circuit CAR is stored in a register of circuit CAR.

The address phase 302 of read access 300 is followed by the data phase 306 (block "Data Phase of Read Access CAR") of this access 300.

During data phase 306, at a step 308 (block "Provide CIDm"), circuit CAR supplies bus BUS with the compartment identifier that circuit CAR has stored at step 304 of the previous address phase 302. The compartment identifier supplied to bus BUS then corresponds to the data item of read access 300, that is, to the data item which is read from circuit CAR by the processor CPUi having initiated access 300.

The end of data phase 306 marks the end of the read access 300 to circuit CAR.

Figure 4:
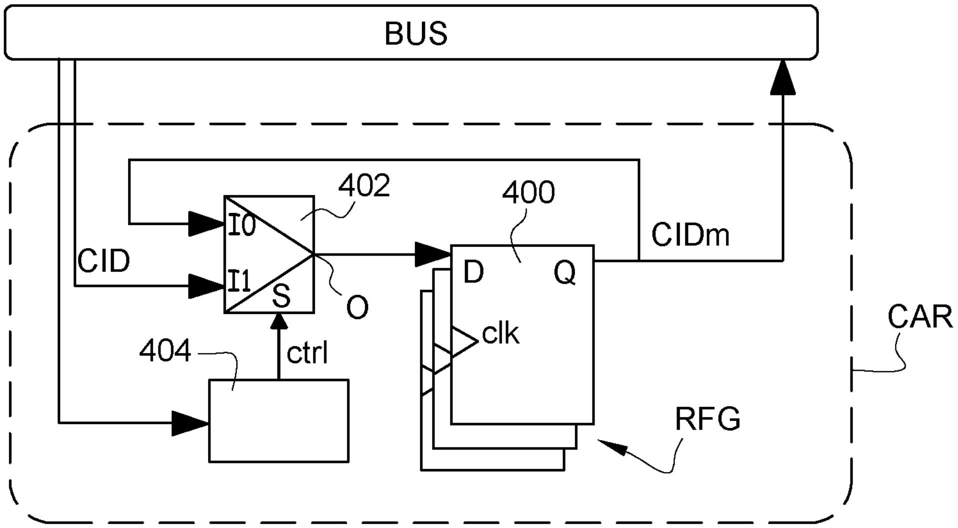
FIG. 4 shows, in the form of blocks, an example of a detailed embodiment of a circuit of the device of FIG. 2.

FIG. 4 shows, in the form of blocks, an example of a detailed embodiment of the circuit CAR of the device 2 of FIG. 2.

Circuit CAR comprises a register REG. Register REG is configured to store, during the address phase of each read access to circuit CAR, the identifier of the processor CPUi having initiated the access, this identifier being supplied to bus BUS by the circuit CIDi associated with this processor CPUi. Register REG is also configured, during the data phase of each read access to circuit CAR, to supply bus BUS with the identifier stored during the previous address phase.

For example, register REG comprises a plurality of D-type flip-flops 400. For example, each flip-flop 400 comprises a data input D configured to receive a bit, an output Q configured to supply a bit stored in flip-flop 400, and a clock input elk configured to receive a timing signal, for example the clock signal of bus BUS. Each flip-flop 400 is then configured, at each active edge of the clock signal received on its input elk, to store the bit present on its input D and to accordingly update its output Q.

As an example, circuit CAR comprises a selection or routing circuit 402. Circuit 402 is configured to deliver, to the data input of register REG, the compartment identifier CID present over bus BUS during the address phase of each read access to circuit CAR, and the compartment identifier CIDm stored in register REG otherwise.

As an example, circuit 402 comprises an input I0, an input I1, a selection input S, and an output O coupled, preferably connected, to the input of REG register, for example to the D inputs of flip-flops 400. The input I1 of circuit 402 is, for example, configured to receive the compartment identifier CID present over bus BUS during the address phase of each read or write access initiated by a processor CPUi, the input I0 of circuit 402 being, for example, configured to receive the output of register REG, that is, the identifier CIDm stored in register REG. The input S of circuit 402 is, for example, configured to receive a binary control signal ctrl. When signal ctrl is in a first binary state, circuit 402 couples its input I1 to its output O, or, in other words, delivers on its output O the identifier CID present on its input I, and, when signal ctrl is in a second binary state, circuit 402 couples its input I0 to its output O, or, in other words, delivers on its output O the stored identifier CIDm present on its input I0. Signal ctrl is configured to be in its first binary state during the address phase of each read access to circuit CAR, and in its second binary state otherwise.

As an example, circuit CAR comprises a circuit 404 configured to deliver signal ctrl based on signals available over bus BUS. For example, circuit 404 is configured to detect that an access to circuit CAR has been initiated by a processor CPUi based on the address present over bus BUS and on the indication present over bus BUS that a read access is requested.

Those skilled in the art will be able of providing other examples of implementation of circuit CAR based on the functional indications given hereabove. For example, circuit 402 may be omitted. In such an example, the data input of register REG then directly receives the compartment identifier CID present over bus BUS, and register REG, for example each of flip-flops 400, further comprises an activation input receiving signal ctrl and being configured to allow the updating of register REG only during active edges of the clock signal of bus BUS while signal ctrl is in its first binary state, and not to modify, or update, register REG if signal ctrl is in its second binary state.

Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove.

What is claimed is:

1. A device comprising:

a bus;

processors coupled to the bus, and configured to execute a same instruction set and initiate accesses to peripherals via the bus, each access comprising an address phase followed by a data phase;

for each processor, a second circuit associated with the processor and configured to provide an identifier of the processor on the bus during the address phase of each access initiated by the processor; and the peripherals, coupled to the bus, the peripherals comprising a first circuit configured to, at each read access to the first circuit initiated by one of the processors:

store the identifier present on the bus during the address phase of the access, to produce a stored identifier; and provide the bus with the stored identifier during the data phase of the access;

wherein the one of the processors is configured to obtain the stored identifier provided on the bus by the first circuit.

2. The device according to claim 1, wherein:

the peripherals comprise a memory shared between at least two of the processors; and a program comprising a sequence of instructions of the instruction set is stored in the memory and is accessible to the at least two of the processors.

3. The device according to claim 2, wherein the program comprises at least one portion an execution of which is conditioned by the identifier of the processor executing the program.

4. The device according to claim 1, wherein, for each access by an accessing processor of the processors to one of the peripherals other than the first circuit, the device is configured to condition access to the peripheral based on the identifier of the processor having initiated the access.

5. The device according to claim 1, wherein the first circuit comprises a register configured to:

store, during the address phase of each read access to the first circuit, the identifier present on the bus and corresponding to the processor having initiated the read access; and provide the bus with, during the data phase of each read access to the first circuit, the identifier stored during the address phase of the read access.

6. The device according to claim 1, wherein each identifier corresponds to a different processor.

7. The device according to claim 1, wherein the second circuits are inaccessible to reads and writes by the processors.

8. The device according to claim 1, wherein the bus is an advanced microcontroller bus architecture (AMBA)-type bus.

9. The device according to claim 1, wherein the identifier of each processor is hard-coded in the second circuit associated with the processor.

10. The device according to claim 1, wherein the first circuit is read-only accessible.

11. A method implemented in a device comprising a bus, peripherals connected to the bus and comprising a first circuit, processors coupled to the bus, executing a same instruction set, each being associated with a second circuit and initiating accesses to the peripherals via the bus, each access comprising an address phase followed by a data phase, the method comprising:

initiating, by one of the processors, a read access to the first circuit;

providing the bus with, during the address phase of the access and with the second circuit associated with the processor initiating the access, an identifier of the one of the processors;

storing, by the first circuit, the identifier present on the bus during the address phase of the access, to produce a stored identifier;

providing, by the first circuit during the data phase of the access, the bus with the stored identifier; and obtaining, by the one of the processors, the stored identifier provided on the bus by the first circuit.

12. The method according to claim 11, wherein:

the peripherals comprise a memory shared between at least two of the processors; and a program comprising a sequence of instructions of the instruction set is stored in the memory and is accessible to the at least two of the processors.

13. The method according to claim 12, wherein the program comprises at least one portion an execution of which is conditioned by the identifier of the processor executing the program.

14. The method according to claim 11, wherein, for each access by an accessing processor of the processors to one of the peripherals other than the first circuit, the device is configured to condition access to the peripheral based on the identifier of the processor having initiated the access.

15. The method according to claim 11, wherein the first circuit comprises a register configured to:

store, during the address phase of each read access to the first circuit, the identifier present on the bus and corresponding to the processor having initiated the read access; and provide the bus with, during the data phase of each read access to the first circuit, the identifier stored during the address phase of the read access.

16. The method according to claim 11, wherein each identifier corresponds to a different processor.

17. The method according to claim 11, wherein the second circuits are inaccessible to reads and writes by the processors.

18. The method according to claim 11, wherein the bus is an advanced microcontroller bus architecture (AMBA)-type bus.

19. The method according to claim 11, wherein the identifier of each processor is hard-coded in the second circuit associated with the processor.

20. The method according to claim 11, wherein the first circuit is read-only accessible.

* * * * *